(12) United States Patent
Kuo et al.

(10) Patent No.: US 7,367,860 B2
(45) Date of Patent: May 6, 2008

(54) SINTERING METHOD FOR CARBON NANOTUBE CATHODE OF FIELD-EMISSION DISPLAY

(75) Inventors: Chih-Che Kuo, Guanyin Township, Taoyuan County (TW); Wei-Sheng Hsu, Guanyin Township, Taoyuan County (TW); Chun-Yen Hsiao, Guanyin Township, Taoyuan County (TW)

(73) Assignee: Teco Nanotech Co., Ltd., Taoyuan (TW)

( * ) Notice: Subject to any disclaimer, the term of this patent is extended or adjusted under 35 U.S.C. 154(b) by 855 days.

(21) Appl. No.: 10/883,708

(22) Filed: Jul. 6, 2004

(65) Prior Publication Data

US 2006/0009110 A1 Jan. 12, 2006

(51) Int. Cl.
*H01J 9/00* (2006.01)

(52) U.S. Cl. .......................................... 445/50; 445/49

(58) Field of Classification Search ............ 445/49–51, 445/23–25
See application file for complete search history.

(56) References Cited

U.S. PATENT DOCUMENTS

| 6,495,258 | B1* | 12/2002 | Chen et al. | 428/408 |
| 2004/0055892 | A1* | 3/2004 | Oh et al. | 205/109 |
| 2005/0272342 | A1* | 12/2005 | Chen et al. | 445/50 |

* cited by examiner

*Primary Examiner*—Joseph L Williams

(57) ABSTRACT

A vacuuming sintering method for forming a carbon nanotube of a field display is disclosed. A cathode is attached to an anode, and the assembly of the cathode and anode is disposed on a heating element of a vacuum sintering furnace with cathode adjacent to the heating element. Each of the cathode and anode has at least one electrode lead connected to an external voltage source. The internal pressure of the vacuum sintering furnace is reduced, the heating element is activated, and a voltage is provided across the cathode and the anode, such that an electric field is generated between the cathode and the anode. The voltage is switched off after the electric field is formed and continuing heating for a predetermined period of time. The heating is terminated and the assembly of the cathode and anode is removed from the vacuum sintering furnace, such that the carbon nanotube is formed parallel to the electric field and perpendicular to the cathode, or one end of the carbon nanotube is inclined towards the anode to advantage electron generation therefrom.

12 Claims, 2 Drawing Sheets

SINTERING METHOD FOR CARBON NANOTUBE CATHODE OF FIELD-EMISSION DISPLAY

BACKGROUND OF THE INVENTION

The present invention relates in general to a sintering method for a carbon nanotube of a field-emission display, and more particularly, to a method using a locking member to interlock the cathode structure with the anode structure an electric connector based. A specific electric field is applied during the vacuum sintering process. The carbon nanotube of the cathode structure is inclined to the anode by a smaller angle or parallel with the electric field. One end of the carbon nanotube is attached to the cathode and perpendicular thereto.

The conventional cathode structure of field-emission display, such as the Spindt type metal spike configuration is fabricated by thin-film lithography process. The threshold electric field of this type of field-emission display is as high as hundreds of Volts per micron. Therefore, the cost for the driving device is relatively high.

The carbon nanotube structure has very good aspect ratio. The gauge of the carbon nanotube is normally several to tens of nanometers, and the length of the carbon nanotube can reach several microns. The carbon nanotube is also thermally stable and stretchable, such that it has been considered to be a very good electron emission source of field-emission displays. For example, the carbon nanotuble directly grown on the cathode electrode by CVD has been developed and readily applied already. Such technique uses catalytic metal to vertically deposit the carbon nanotube on the cathode electrode, followed by patterning process to form uniform carbon nanotube allowing the current density of tens to hundreds of mA per square cm. However, such technique, being limited by the material and structure factors, provides a threshold electric field as high as $10V/\mu m$. It can thus be formed on silicon wafer currently and is hardly commercialized.

Another conventional nano-technology includes arc discharge. The arc discharge can produce a carbon nanotube more suitable for use in the field-emission display. Such technology combined with screen printing and coating reduces the threshold voltage under $2V/\mu m$. The carbon nanotube formed on the cathode electrode surface is patterned to form the electron emission source. However, the thick film of the carbon nanotube formed on coating technique results in nondirective carbon nanotube, so as to produce terminal disorder of the electrons. Therefore, the density of the electron emission is non-uniform, and the electrons generated at a higher terminal easily generate shielding effect upon the neighboring terminals, such that the electron generation in the neighboring terminals is affected. In addition, the property of the adhesion material typically used to attach the carbon nanotube to the cathode electrode affect the dispersion and distribution of the carbon nanotube.

Currently, the vacuum sintering technique allows the carbon nanotube directly attached to the cathode electrode, such that the drawbacks caused by the coating process and the adhesion material are resolved. Therefore, the density of the carbon nanotube can be increased to increase the density of electron generation. However, as the carbon nanotube is randomly applied to the glass substrate of the cathode structure, interference and interleaving effect between the carbon nanotubes occur. One end of the carbon nanotube cannot be vertically attached to the glass substrate by the application of electric field.

BRIEF SUMMARY OF THE INVENTION

A vacuuming sintering method is provided for forming a carbon nanotube of a field display. A cathode is attached to an anode, and the assembly of the cathode and anode is disposed on a heating element of a vacuum sintering furnace with cathode adjacent to the heating element. Each each of the cathode and anode has at least one electrode lead connected to an external voltage source. The internal pressure of the vacuum sintering furnace is reduced, the heating element is activated, and a voltage is provided across the cathode and the anode, such that an electric field is generated between the cathode and the anode. The voltage is switched off after the electric field is formed and continuing heating for a predetermined period of time. The heating is terminated and the assembly of the cathode and anode is removed from the vacuum sintering furnace, such that the carbon nanotube is formed parallel to the electric field and perpendicular to the cathode, or one end of the carbon nanotube is inclined towards the anode to advantage electron generation therefrom.

The heating element includes infrared ceramic heating board, for example. The method may further comprise a step of vacuuming the vacuum sintering furnace to a pressure of $10^{-5}$ torr. The cathode includes a first conductive layer formed on a substrate to serve as a cathode electrode. The cathode electrode includes material of which the melting point is lowered in vacuum, so as to allow the carbon nanotube embedded therein, such material includes copper, aluminum, silver, gold or chromium. The cathode includes an electrode lead connected the first conductive layer to a voltage source. The method further comprises a step of coating a carbon nanotube on the first conductive layer on the first conductive layer. The anode has a glass substrate or a silicon wafer, and the cathode includes a glass substrate. The glass substrate of the cathode includes an electrode lead connected to a voltage source. The anode includes a first conductive layer formed on a substrate, the first conductive layer includes ITO, chromium or aluminum. The method further comprises forming a spacer between the cathode and the anode to maintain a predetermined space between the cathode and the anode.

BRIEF DESCRIPTION OF THE DRAWINGS

The above objects and advantages of the present invention will be become more apparent by describing in detail exemplary embodiments thereof with reference to the attached drawings in which.

DETAILED DESCRIPTION OF THE INVENTION

Figure 1:
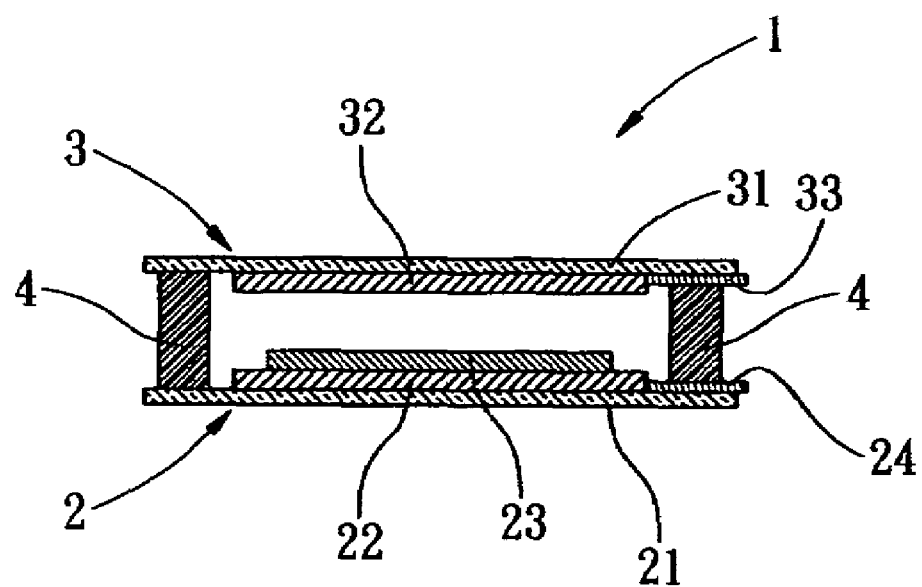
FIG. 1 is a schematic drawing of the field-emission display.
Figure 2:
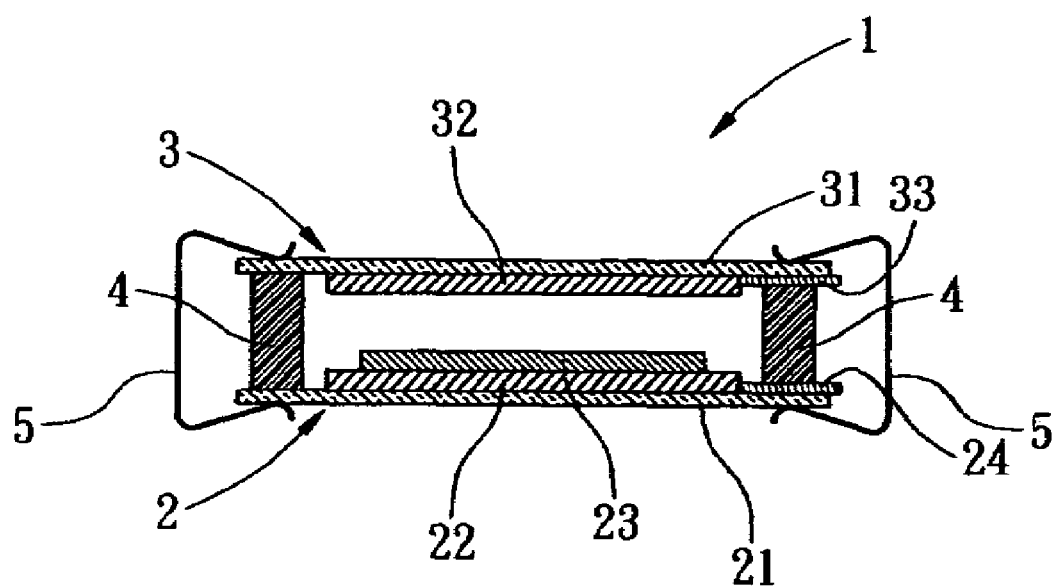
FIG. 2 is the field-emission display assembled by a fastening device.

FIGS. 1 and 2 show the cathode structure and the locking member. The carbon nanotube of the field-emission display is directively sintered. As the carbon nanotube electron emission source formed on the cathode structure 2 of the field-emission display 1 are randomly applied to the glass substrate 21 of the cathode structure 2, interference and interleaving effects occur, such that one end of the carbon nanotube cannot be properly perpendicularly attached to the glass substrate 21 by application of electric field.

In this embodiment, a first conductive layer 22 is formed on the glass substrate 21 of the cathode structure 2. The first conductive layer 22 is the cathode electrode of which the melting point can be reduced in vacuum, so as to allow the carbon nanotube embedded therein. The material of the cathode electrode includes copper, aluminum, silver, gold or chromium, for example. One side of the glass substrate 21 opposing to the first conductive layer 22 includes an electrode line 24 for transmitting a control voltage to the first conductive layer 22.

A carbon nanotube layer is coated on the first conductive layer 22. Alternatively, a carbon nanotube solution is prepared to form the second conductive layer 23 of the electron emission source.

An anode 3 is disposed to face and align with the electron emission source. The substrate 31 of the anode 3 includes heat resistant silicon wafer or glass, for example. A first conductive layer 32 is formed on the substrate 31 to subject to a voltage to form the electric field. Conductive material such as ITO, chromium or aluminum. One side of the glass substrate 31 opposite to the conductive layer includes an electrode line 33 for transmitting control voltage to the first conductive layer 32.

A spacer 4 is formed between the anode 3 and the cathode structure 2 to maintain a constant space between the anode 3 and the cathode 2. thereby, a uniform electric field can be formed by the voltage across the cathode 2 and the anode 3.

A fastening member 5 is provided for attaching the cathode 2 with the anode 3.

Figure 3:
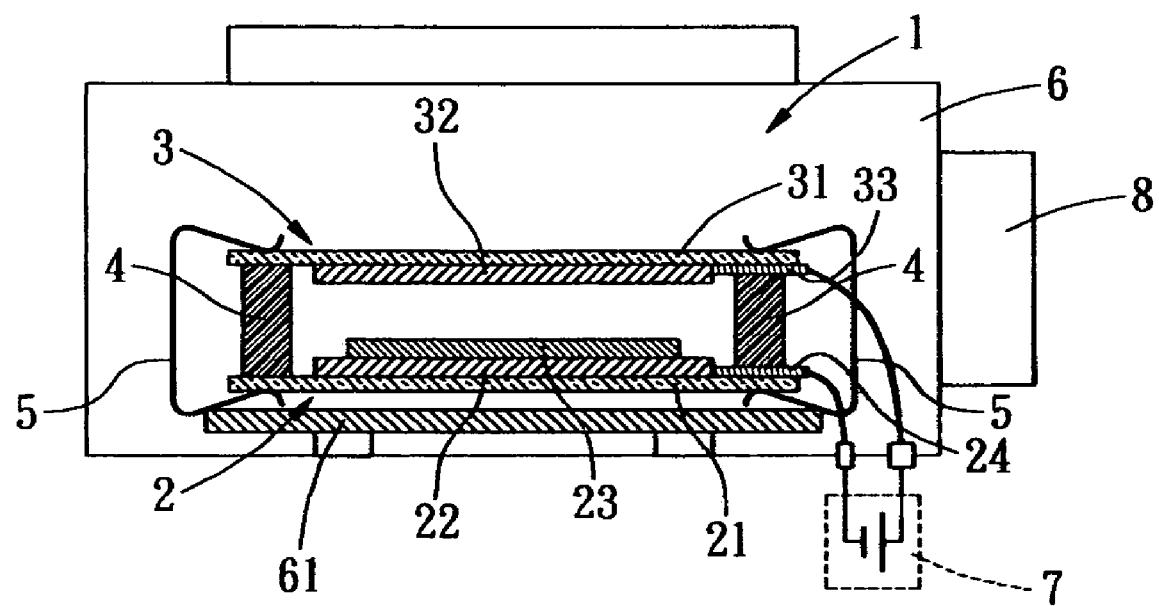
FIG. 3 shows the vacuuming sinter of the cathode.

FIG. 3 illustrates the vacuum sintering applied to the cathode 2. As shown, the assembled cathode 2 and anode 3 are disposed on the heating element (infrared ceramic) 61 of the vacuum sinter furnace 6. The glass substrate 21 is adjacent to the heating element 61, and the electrode wires 24 and 33 are connected to the external voltage source 7 by a heat-resistant conductive wire.

A vacuuming apparatus 8 is used to reduce the pressure of the vacuum sintering furnace down to about $10^{-5}$ torr. The heating element 61 starts to heat up after the vacuum apparatus 8 is activated. The heating element 61 is operative to heating the furnace up to about 350° C. after the furnace is vacuumed. By continuously heating the furnace for about 10 min, a control voltage is applied across the cathode 2 and the anode 3, such that an electric field is generated between the cathode 2 and the anode 3. In the case that the space between the cathode 2 and the anode 3 is 150 microns, a 300V voltage provide a 2V/micron electric field between the cathode 2 and the anode 3. After ten minutes, the heating process is terminated, and the cathode assembly can be removed from the furnace.

The vacuum sintering process provides a carbon nanotube electron emission source with a threshold electric field as low as 1.8V/micron when the applied current is 10 microamp. When the electric field is higher than 2.8V, the current density can reach 10 mA. However, the vacuum sintering process as described in the above embodiment provides the threshold electric field lower than 1.7V/micron with an applied current density of about 10 micro-amp. The electric field higher than 2.4V/micron may also obtain the current density of about 10 mA. Therefore, the application voltage can be further lowered, such that the cost of the driving device is reduced.

While the present invention has been particularly shown and described with reference to preferred embodiments thereof, it will be understood by those of ordinary skill in the art the various changes in form and details may be made therein without departing from the spirit and scope of the present invention as defined by the appended claims.

What is claimed is:

1. A vacuuming sintering method for a carbon nanotube of a field display, comprising:

attaching a cathode to an anode;

disposing the attached cathode and anode on a heating element of a vacuum sintering furnace with cathode adjacent to the heating element, wherein each of the cathode and anode has at least one electrode lead connected to an external voltage source;

reducing internal pressure of the vacuum sintering furnace, activating the heating element, and providing a voltage across the cathode and the anode, so as to generate an electric field between the cathode and the anode;

switching off the voltage after the electric field is formed and continuing heating for a predetermined period of time;

terminating heating and removing the attached cathode and anode from the vacuum sintering furnace, such that the carbon nanotube is formed parallel to the electric field and perpendicular to the cathode, or one end of the carbon nanotube is inclined towards the anode to advantage electron generation therefrom.

2. The method of claim 1, wherein the heating element includes infrared ceramic heating board.

3. The method of claim 1, further comprising a step of vacuuming the vacuum sintering furnace to a pressure of $10^{-5}$ torr.

4. The method of claim 1, wherein the cathode includes a first conductive layer formed on a substrate to serve as a cathode electrode.

5. The method of claim 4, wherein the cathode electrode includes material of which the melting point is lowered in vacuum, so as to allow the carbon nanotube embedded therein, such material includes copper, aluminum, silver, gold or chromium.

6. The method of claim 1, wherein the cathode includes an electrode lead connected the first conductive layer to a voltage source.

7. The method of claim 1, further comprising coating a carbon nanotube on the first conductive layer on the first conductive layer.

8. The method of claim 1, wherein the anode has a glass substrate or a silicon wafer.

9. The method of claim 8, wherein the cathode includes a glass substrate.

10. The method of claim 9, wherein the glass substrate of the cathode includes an electrode lead connected to a voltage source.

11. The method of claim 1, wherein the anode includes a first conductive layer formed on a substrate, the first conductive layer includes ITO, chromium or aluminum.

12. The method of claim 1, further comprising forming a spacer between the cathode and the anode to maintain a predetermined space between the cathode and the anode.

\* \* \* \* \*